(12) United States Patent
Taulbee

(10) Patent No.: US 7,785,553 B2
(45) Date of Patent: Aug. 31, 2010

(54) REDUCING EXPLOSIVE POTENTIAL OF AMMONIUM NITRATE

(75) Inventor: Darrell N. Taulbee, Frankfort, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 211 days.

(21) Appl. No.: 12/035,714

(22) Filed: Feb. 22, 2008

(65) Prior Publication Data

US 2008/0223098 A1    Sep. 18, 2008

Related U.S. Application Data

(60) Provisional application No. 60/894,728, filed on Mar. 14, 2007.

(51) Int. Cl.
C01C 1/18    (2006.01)
(52) U.S. Cl. .................. 423/274; 71/50; 71/54; 71/58; 71/64.07; 423/396
(58) Field of Classification Search ............... 71/64.07, 71/50, 54, 58; 423/396, 274
See application file for complete search history.

(56) References Cited

U.S. PATENT DOCUMENTS

| | | | | |
|---|---|---|---|---|
| 2,879,133 | A | * | 3/1959 | Marti, Jr ............. 423/267 |
| 3,190,774 | A | * | 6/1965 | Wilson ............... 149/7 |
| 3,241,947 | A | | 3/1966 | Young |
| 3,366,468 | A | | 1/1968 | Porter |
| 3,379,496 | A | | 4/1968 | Russo |
| 3,598,563 | A | * | 8/1971 | Burch ................ 71/28 |
| 3,867,124 | A | | 2/1975 | Church |
| 4,026,696 | A | | 5/1977 | Young |
| 4,028,087 | A | | 6/1977 | Schultz et al. |
| 4,028,088 | A | | 6/1977 | Young et al. |
| 4,220,463 | A | | 9/1980 | Van Hijfte et al. |
| 4,410,350 | A | | 10/1983 | Judd |
| 4,469,503 | A | | 9/1984 | Stockel |
| 4,500,335 | A | | 2/1985 | Fenn |
| 5,154,752 | A | | 10/1992 | Scheibler et al. |
| 5,186,732 | A | | 2/1993 | Thompson et al. |
| 5,378,259 | A | | 1/1995 | Bassetti et al. |
| 5,454,889 | A | | 10/1995 | McNicol et al. |
| 5,468,276 | A | | 11/1995 | Roth et al. |
| 5,630,861 | A | * | 5/1997 | Yaniv .................. 71/28 |
| 5,720,794 | A | | 2/1998 | Tortorelli |
| 6,344,066 | B1 | | 2/2002 | Eyal |
| 6,413,292 | B1 | | 7/2002 | Locquengh et al. |
| 6,508,995 | B1 | | 1/2003 | Engel et al. |

(Continued)

OTHER PUBLICATIONS

U.S. Appl. No. 08/691,169, filed Aug. 1, 1996, Taulbee et al.

*Primary Examiner*—Wayne Langel
(74) *Attorney, Agent, or Firm*—King & Schickli, PLLC

(57) ABSTRACT

A method for reducing the explosive potential of a nitrogen-based fertilizer product includes coating the product with a composition including a coal combustion by-product. The coal combustion by-product may be oxidized prior to coating the product, and further may be one or more of Class C fly ash, Class F fly ash, and flue gas desulfurization waste. A primary binder and one or more secondary binders may be included. The primary binder may be water. The secondary binder may be one or more of an organic and an inorganic binder.

23 Claims, 10 Drawing Sheets

U.S. PATENT DOCUMENTS

| | | |
|---|---|---|
| 6,669,753 B1 | 12/2003 | Chambers et al. |
| 6,689,181 B2 | 2/2004 | Highsmith et al. |
| 7,055,325 B2 | 6/2006 | Wolken |
| 2002/0095966 A1 | 7/2002 | Highsmith et al. |
| 2005/0238549 A1 | 10/2005 | Hammel |
| 2006/0243010 A1* | 11/2006 | Sanders et al. ............ 71/28 |
| 2007/0096350 A1 | 5/2007 | Kweeder et al. |
| 2007/0199357 A1 | 8/2007 | Kweeder et al. |
| 2008/0098781 A1 | 5/2008 | Lylykangas et al. |

* cited by examiner

REDUCING EXPLOSIVE POTENTIAL OF AMMONIUM NITRATE

This application claims the benefit of priority in U.S. Provisional Patent Application Ser. No. 60/894,728, filed on Mar. 14, 2007, the entirety of the disclosure of which is incorporated herein by reference.

The invention was made with partial Government support under Department of Homeland Security, the National Institute of Hometown Security Kentucky: Homeland Security University Consortium, Subaward #06-199. The Government may have certain rights in this invention.

TECHNICAL FIELD

The present invention relates generally to a method for reducing the explosive potential of an ammonium nitrate material. In particular, the present invention relates to reducing explosive potential of ammonium nitrate by coating with by-products of coal combustion.

BACKGROUND OF THE INVENTION

There are a number of solid materials of commercial importance that are produced, shipped and stored in bulk in today's marketplaces that exhibit a dangerous potential for explosion. One such material is nitrogen-based fertilizers. For example, ammonium nitrate is an essential component for numerous nitrogen-based fertilizer products.

Ammonium nitrate based fertilizers have experienced widespread use and acceptance in the agricultural industry over the past several decades. However, despite its agricultural benefits, ammonium nitrate is a highly volatile and unstable material with explosive hazard characteristics. Indeed, despite its beneficial and critical role in agriculture, ammonium nitrate has become a vehicle for disseminating chaos and is widely recognized as one of the most significant threats to society, as demonstrated in a number of malicious attacks such as the Alfred P. Murrah Federal building in Oklahoma City, the Marriott Hotel in Jakarta, and the Sari Club in Bali. Ammonium nitrate mixed with fuel oil creates a powerful explosive, ANFO, which is a weapon of choice for acts of terrorism due to relatively low cost, availability, ease of assembly, and magnitude of destructive force released upon detonation.

In order to make ammonium nitrate fertilizers safe for consumer use, the explosive potential of the ammonium nitrate must be somehow controlled. Prior attempts to control the explosive potential of ammonium nitrate have included addition of desensitizing agents, such as polymeric coatings or diluents, or the substitution of alternative nitrogen sources. However, desensitizing agents are for the most part ineffective, costly, and may impart undesirable side effects. Even more, despite recommendations regarding reducing explosive potential of ammonium nitrate, attempts to control the sale of agricultural-grade product or to mandate addition of desensitizing agents have met with resistance stemming from a perceived negative impact on price and accessibility coupled with an apparent ineffectiveness of the proposed desensitizing agents when added at concentrations that are compatible with agriculture.

Alternate sources of nitrogen-containing fertilizers include potassium nitrate, urea and anhydrous ammonia. Alternatives such as anhydrous ammonia require increased infrastructure costs for distribution, are a concern due: to toxic fumes, suffer from potential volatile losses following application, and unlike ammonium nitrate, must be applied subsurface to croplands requiring more expensive application equipment with an accompanying increase in application costs. Other alternatives such as urea may be less effective due to ammonia volatilization, and indeed are also potentially explosive. For certain agricultural crops such as vegetables, tobacco, hay, and pasture lands, ammonium nitrate has distinct advantages in both economy and ease of application compared to potential nitrogen-fertilizer substitutes.

As another example, the dilution of ammonium nitrate with inert or thermally stable materials in order to reduce the potential for explosion is a common practice well known in the art. For example, ammonium nitrate marketed in Ireland, as well as most of Europe, is marketed at less than 79 weight percent of ammonium nitrate: that is, 78.5% ammonium nitrate and 21.5% thermally stable diluent. The diluent most commonly employed is calcium carbonate (lime). While the calcium carbonate does reduce the explosive potential, its added mining and crushing costs significantly increases the final delivery costs for an equivalent amount of ammonium nitrate. Even more, carbonates are easily evolved with acid to increase ammonium nitrate concentration. Thus, calcium carbonate is not an economically attractive diluent nor is it a totally effective blast mitigant. Still, it is used because alternative safe, effective, inexpensive, and agriculturally beneficial diluents are unknown to those skilled in the art.

As a further disadvantage, it should be appreciated that calcium carbonate may be easily removed: from the ammonium nitrate by adding an acid to the mixture. This converts the calcium carbonate ($CaCO_3$) to calcium oxide (CaO) and carbon dioxide ($CO_2$). The carbon dioxide is gaseous so the effective weight of the diluent is decreased and the concentration of the ammonium nitrate is effectively increased along with the explosive potential. In this way, it is possible to easily obtain a product having a higher weight percent of ammonium nitrate and thus higher explosive capabilities. Accordingly, the mixing of ammonium nitrate with calcium carbonate has little if any deterrent effect with respect to radical terrorist groups and others seeking to construct explosive devices.

Other attempts at controlling the explosive characteristics of ammonium nitrate have included the use of di- or mono-ammonium phosphate as a diluting material. It was originally thought that the addition of one or both of these chemicals at 5 to 10 weight percent would prevent ammonium nitrate from violently decomposing. However, it is now understood that the phosphate additives do not prevent the ammonium nitrate from exploding, and in fact, the energy release from an explosion of the ammonium nitrate/phosphate mix may be even greater than the energy release from pure ammonium nitrate. Furthermore, the ammonium phosphate additives can be easily removed from the ammonium nitrate/phosphate mix through the addition of calcium nitrate which in turn forms even more ammonium nitrate. Thus, it is clear that the phosphate additives do very little, if anything, to increase the stability of ammonium nitrate or deter terrorist activities. Thus, ammonium nitrate remains widely and readily available.

Accordingly, a need is identified for a cost efficient and effective method for providing an ammonium nitrate product which, while retaining agricultural benefits is significantly less prone to explosion, either accidental or through malevolent intent.

SUMMARY OF THE INVENTION

In accordance with the foregoing need identified in the art, in one aspect a method is provided for reducing explosive potential of a component of a nitrogen-based fertilizer, comprising coating the component with one or more by-products of the coal-combustion process. The nitrogen-based fertilizer may be ammonium nitrate. The coal combustion byproduct may be oxidized prior to use. In specific embodiments, ammonium nitrate particles or prills are coated with one or more of a Class C fly ash (FAC), a Class F fly ash (FAF), flue-gas desulfurization waste (FGD), and atmospheric fluidized bed combustion waste (AFBC). In one embodiment, the ammonium nitrate is coated with a coal combustion by-product in an amount of at least 15 wt. %. Any suitable coating method is contemplated for the method of the present invention, with the proviso that a substantially even coating of a suitable thickness is achieved. In one embodiment, the present invention contemplates coating ammonium nitrate by use of a drum roller. However, other coating methods which provide a substantially even coating of suitable thickness are contemplated, such as spraying, immersion, disk pelletization, and the like.

In another aspect, a method for reducing explosive potential of component of a nitrogen-based fertilizer, including without limitation ammonium nitrate, is provided, comprising coating an ammonium nitrate particle or prill with a composition comprising a coal combustion by-product, and a primary binder. The primary binder may be water. The method further contemplates inclusion of a secondary binder, which may be any industrial binder as is known in the art, including one or more organic and inorganic binders such as without limitation lignosulfonates, molasses, molasses-lime, pitch, caustic soda, gilsonite, rosins, resins, PVA, casein, clays, tall oil, coal tar, boric acid, guar gum, starch, sodium silicate, bentonite, and the like. In specific embodiments of the invention, the organic secondary binder may be selected from guar gum or starch, and the inorganic secondary binder may be selected from sodium silicate or bentonite. The organic binder may be added in an amount of about 0.25 wt. % of the total coating weight, and the inorganic binder may be added in an amount of about 0.5 wt. % of the coated-product weight. The primary binder may be added in an amount of from about 0.2% to about 0.6% per 10 wt % of CCB coating. In one embodiment, the primary binder is added at about 1.5% of the total coated-product weight.

In yet another aspect of the present invention, a method for reducing explosive potential of an ammonium nitrate product is provided, comprising the steps of: (1) providing an ammonium nitrate product (2) adding a binder composition to the ammonium nitrate; (3) adding a coal combustion by-product to the ammonium nitrate:binder mixture; (4) blending the ammonium nitrate:binder:coal combustion by-product mixture; and (S) obtaining a coated ammonium nitrate product having a mean particle distribution of from about −6 to about +20 mesh.

Other objects and applications of the present invention will become apparent to those skilled in this art from the following description wherein there is shown and described a preferred embodiment of this invention, simply by way of illustration of the modes currently best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification illustrates several aspects of the present invention and, together with the description, serves to explain the principles of the invention. In the drawing.

Figure 1:
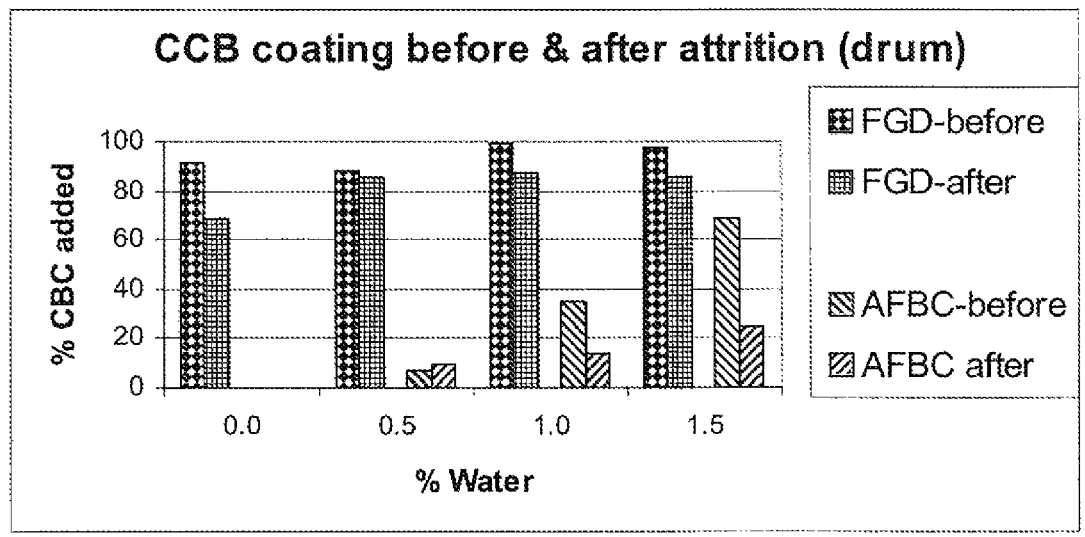
FIG. 1 graphically depicts retention of CCB coatings on ammonium nitrate prills as a function of primary binder (water) addition rate before and after attrition treatment.
Figure 1:
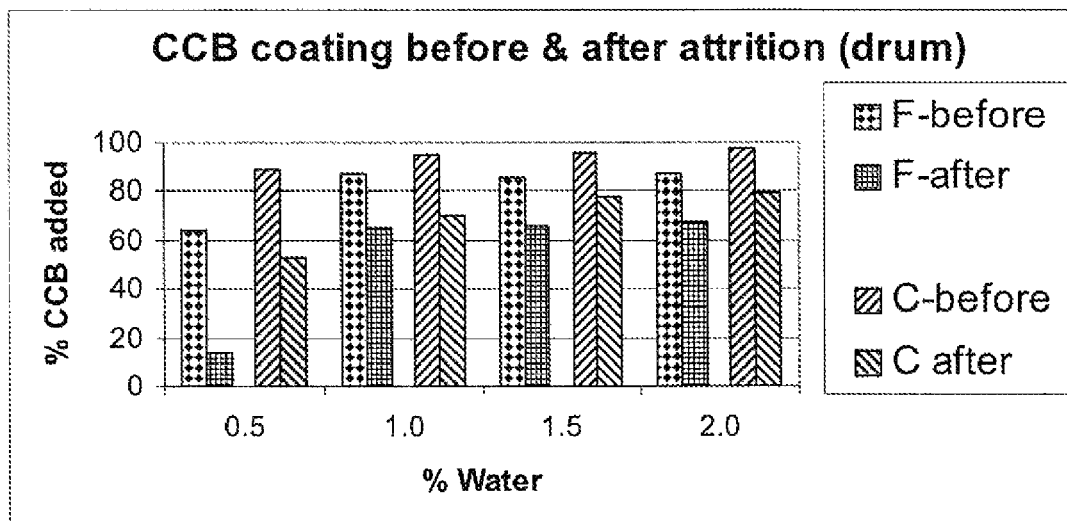

Reference will now be made in detail to the presently preferred embodiments, examples of which are illustrated in the accompanying drawing.

DETAILED DESCRIPTION OF THE INVENTION

As summarized above, described herein are novel methods for reducing explosive potential of a component of a nitrogen-based fertilizer such as ammonium nitrate, which methods include coating particles or prills of the component with one or more coal combustion by-products. The methods described herein may be accomplished by various means which are illustrated in the examples below. These examples are intended to be illustrative only, as numerous modifications and variations will be apparent to those skilled in the art.

EXAMPLE 1

Four types of coal combustion byproducts (CCB) were initially selected for study as potential blast mitigants; Class C fly ash (FAC), Class F fly ash (FAF), flue gas desulfurization waste (FGD), and atmospheric fluidized bed combustion waste (AFBC). Class C fly ash is generated during combustion of the lower rank coals generally found in the US west of the Mississippi river and is relatively high in calcium (Ca) compared to its counterpart, Class F fly ash. The sample used in this study was derived from a sub-bituminous coal and provided by Boral, Inc., San Antonio, Tex. Class F fly ash is generated during combustion of the bituminous-rank coals generally found in the US east of the Mississippi river and is typically high in iron (Fe). The sample of FAF evaluated was derived from an eastern US bituminous coal and collected from electro-static-precipitator bins from the Ghent Power Plant operated by E.ON U.S. in Trimble County, Ky.

Flue gas desulfurization (FGD) byproduct is the material obtained when a slurry of calcined lime is injected into a flue gas stream to capture sulfur-oxide gases. This material is recovered primarily as calcium/magnesium sulfites and sulfates and co-collected fly ash. Since sulfites can be harmful to agriculture, the FGD sample used in this study was oxidized by forced-air oxidation at the power plant in a FGD oxidation plant to convert sulfites to sulfates prior to testing. The sample of oxidized FGD byproduct was also produced at E.ON U.S.'s Ghent Power Station and was processed and provided by Synthetic Materials, Inc., of Cumberland City, Tenn.

The AFBC sample was collected in ESP units downstream from an atmospheric fluidized bed combustor burning a bituminous coal. Coal is combusted in an AFBC boiler at a lower temperature than in a PC boiler permitting limestone to be injected into the combustion bed to absorb sulfur oxides. The ash collected in an AFBC unit is high in calcium- and magnesium-based minerals, particularly calcium oxide and sulfate, but also contains residual coal ash. A one-ton sample of ammonium nitrate fertilizer used in the study was purchased from Werner Farm Supply of Somerset Ky. It was manufactured at El Dorado Chemical, Inc.'s Cherokee, Alabama plant.

Ammonium nitrate prills, which are commonly included as the nitrogen portion of commercially available nitrogen-based fertilizer products, were selected for evaluation. The product used was a one-ton sample of prilled fertilizer (34-0-0; El Dorado Chemical, Inc., Cherokee, Ala.). Two methods of coating ammonium nitrate prills were evaluated: disk and drum pelletization. For disk pelletization, angle of incline, rotation speed, moisture content, and methods of adding the ammonium nitrate, CCB, and moisture were studied. While a few of the processing conditions provided reasonably good coatings, numerous problems were encountered including non-concentric coatings, multi-prill particles, low coating strengths, and the formation of CCB-only aggregates.

For comparison, coatings were applied to ammonium nitrate prills in a one-gallon, 8"-diameter drum roller. Coating the ammonium nitrate entailed loading a targeted weight of ammonium nitrate to the can, placing the can onto a roller mill, spraying the ammonium nitrate with a targeted amount of binder as the drum rotated, and addition of a predetermined amount of CCB. The can was then sealed and rotated at a targeted speed and time interval. Coating ammonium nitrate by use of a drum roller provided a more uniform particle size distribution and better particle integrity than did use of a disk pelletizer. Accordingly, for most experiments ammonium nitrate prills were coated with CCB using a drum roller as described above.

The skilled artisan will appreciate that the specific CCB coating concentrations discussed in the following examples are conservative in that, due to losses of CCBs during the coating process, the actual concentration of the CCB retained as coating (as was confirmed by laboratory analysis of ammonium nitrate concentration of the coated charges) was approximately 15% lower than the estimated values used in the illustrative examples. Additionally, the CCBs used in these evaluations were coated onto the ammonium nitrate on an as received basis, and the estimated coating weight percentages did not take into account the inherent moisture content of the CCBs used. Thus, on a dry weight basis, the CCB coated onto the ammonium nitrate was up to an additional 8% lower than the coating weight values provided in the illustrative examples. As an example, for a 20% FGD coating, accounting for a 15% loss of FGD during the coating process described above and an additional estimated 8% of the FGD weight provided by inherent moisture content, the actual calculated coating weight percent would be 20% * (1−(0.15−0.08))=20% * (0.82)=16.4% of dry FGD.

EXAMPLE 2

A variety of common industrially applicable binders were selected for evaluation, including water, starch, guar gum, bentonite, and sodium silicate. Water was used as a primary binder, and the remaining binders were considered as secondary binders. To determine the optimum rate of primary binder addition, a coating of CCB (25 wt. %) was applied to ammonium nitrate on a roller drum using a predetermined amount of water. Divided samples of each coated ammonium nitrate prill product were subjected to sieve analysis both before and after processing in an attrition mill to obtain a measure of coating efficiency and durability.

With reference to FIG. 1, the plots of the samples prior to attrition (discussed in greater detail below) reveal that the FGD byproduct coated the most efficiently followed closely by the FAC sample and the FAF. The coating for the AFBC sample was less efficient under the experimental conditions imposed. Coating efficiency tended to increase with increasing water addition for all four CCBs evaluated.

Figure 2:
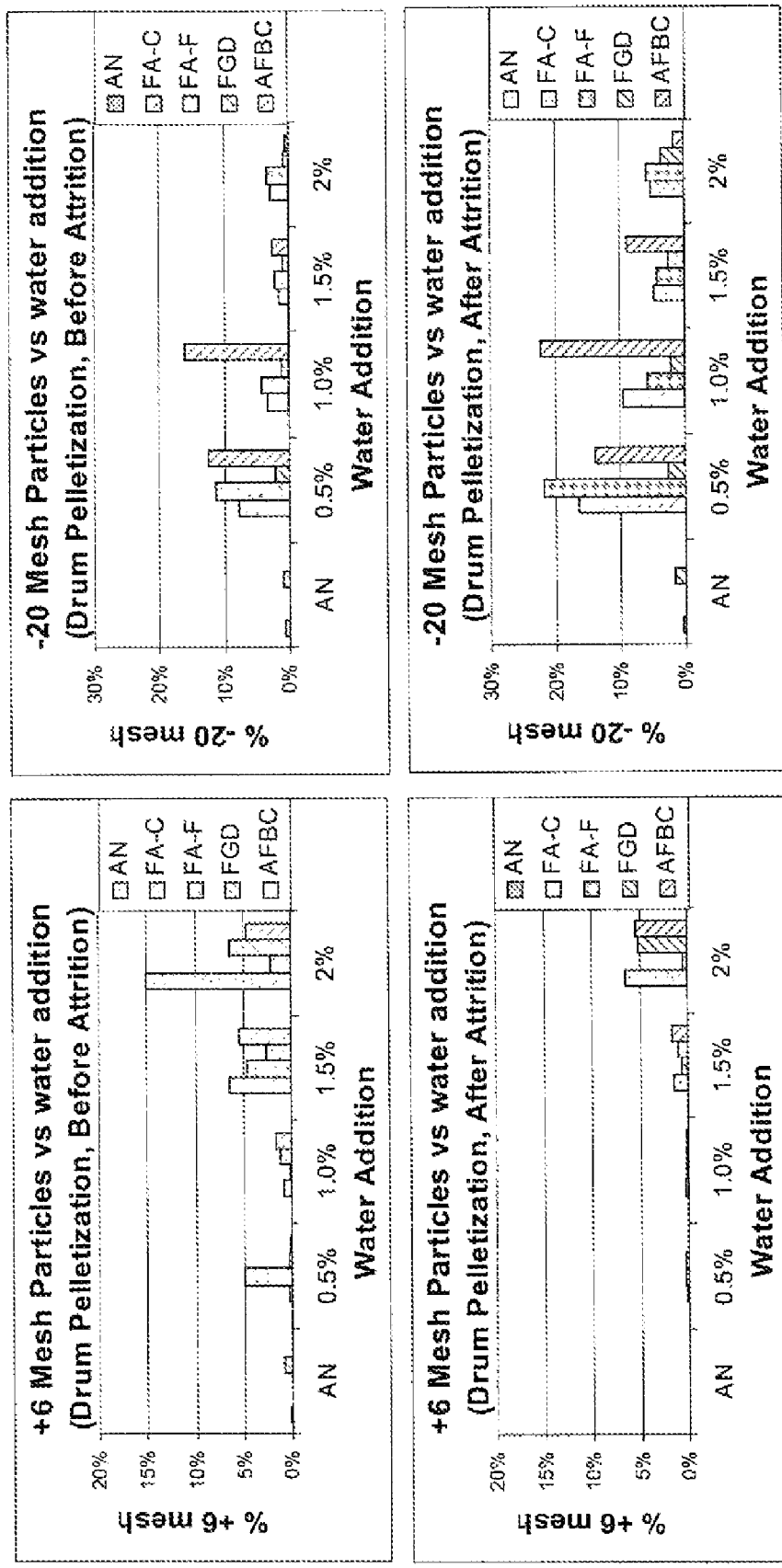
FIG. 2 illustrates the effect of increasing primary binder (water) addition rate on the percentage of coated CCB particles falling outside a mesh range of −6 to +20 mesh.

However, while efficiency of the CCB uptake improved with higher rates of water addition, much of this increase was in the form of +6 mesh particles (see FIG. 2). As discussed above, the presence of +6 mesh particles and of fines (−20 mesh) are undesirable with respect to compatibility with existing equipment for subsequent field application.

EXAMPLE 3

The suitability and durability of the coated particles prepared as in Example 2 were evaluated by measuring their particle size distribution and resistance to attrition, as these are critical parameters for agricultural use. Most of the equipment used for agricultural applications is designed to apply ammonium nitrate in the −6 to +20 mesh size range. To retain compatibility with conventional equipment for applying ammonium nitrate to the soil, it was desirable for the coated particles to remain reasonably close to this mesh size range, and also to be durable enough to withstand the rigors of shipping, handling, and application. Production of multi-prill particles larger than 6 mesh is not an insurmountable problem as these can be crushed or removed at the production site prior to shipment. However, −20 mesh particles that form during transport and handling are more problematic.

The particle size distribution of each sample was determined according to El Dorado Chemical test method EDCC-345. This measurement entailed placing a weighed amount of coated sample atop a series of stacked screens, shaking on a RO-TAP™ mechanical screening unit for three minutes, and then weighing the amount of sample that partitioned to each screen and to a collection pan at bottom. EDCC-345 specifies the use of 6, 8, 10, 12, 14, and 20 mesh screens along with a bottom pan to collect the −20 mesh fines.

For purposes of example, Table 1 shows the particle size distribution of an uncoated ammonium nitrate prill product in comparison to an ammonium nitrate product coated with 20 wt. % FGD (using 0.5 wt % water as primary binder). The data depicts the weight percent, of the coated and uncoated prills partitioning to each mesh range. It can be seen that only a very minor percentage of the coated product exceeded the desired mesh range (−6 to +20 mesh).

TABLE 1

Particle size distribution of coated (20 wt. % FGD) versus uncoated ammonium nitrate.

| | Particle size distribution Mesh size | | | | | | |
|---|---|---|---|---|---|---|---|
| | +6 | 6 × 8 | 8 × 10 | 10 × 12 | 12 × 14 | 14 × 20 | −20 |
| Coated (%) | 0.3 | 21.8 | 28.3 | 39.7 | 5.1 | 4.5 | 0.3 |
| Uncoated (%) | 0.1 | 10.0 | 29.5 | 45.8 | 10.7 | 3.3 | 0.7 |

Resistance to attrition was determined by loading 200 g of sample to a 15-inch diameter, Plexiglas cylinder equipped with 2-inch lifters. The cylinder was rotated at 40 rpm for 5 minutes and the resulting particle-size distribution determined according to EDCC-345. The resistance to attrition, as well as the distribution of particles outside the −6 to +20 mesh range before and after attrition, is illustrated in FIGS. 1 and 2. Based on coating efficiencies, particle size distributions, and resistance to attrition, as set forth above, an optimum water addition rate was identified individually for each CCB (at 25 wt %) for certain subsequent studies. For FAC, FAF, and AFBC, water was added at 1.5 wt %. For FGD, water was added at 0.5 wt. %. However, as will be discussed below in greater detail, the optimum wt % of primary binder was found to vary in a linear relationship with the amount of CCB added as a coating.

Using ammonium nitrate coated with 20 wt. % FGD for purposes of example, Table 2 presents resistance to attrition of the coated product. Data depicts the weight percent of coated prills partitioning to each mesh range. It is noted that the particle size distribution is substantially the same before and after attrition, particularly for the particles outside the desired mesh range of −6 to #20 mesh.

TABLE 2

Particle size distribution of coated (20 wt. % FGD) before and after attrition.

| | Particle size distribution Mesh size | | | | | | |
|---|---|---|---|---|---|---|---|
| | +6 | 6 × 8 | 8 × 10 | 10 × 12 | 12 × 14 | 14 × 20 | −20 |
| Before attrition (%) | 0.3 | 21.8 | 28.3 | 39.7 | 5.1 | 4.5 | 0.3 |
| After attrition (%) | 0.3 | 22.0 | 27.0 | 40.8 | 5.2 | 4.7 | 0.7 |

EXAMPLE 4

Consideration was given to inclusion of a secondary binder in addition to water as a primary binder. Four binding agents, starch (GENVIS®, Archer Daniels Midland. Decatur, Ill.), guar gum, bentonite, and sodium silicate, were evaluated for effects of improvement on ammonium nitrate prill coatings. Water was added as a primary binder at 1.5 wt % of the coating for the AFBC, FAC, and FAF samples, prepared as described above. Water was added at 0.5 wt. % of the total coating weight for the FGD samples. Attrition studies were performed as described in Example 3. The results are presented in Table 3.

TABLE 3

Evaluation of secondary binder retention before and after attrition.

| CCB ID | Binder ID | Binder wt % | Added CCB retained on AN surface as coating Initial | Added CCB retained on AN surface as coating After attrition |
|---|---|---|---|---|
| AFBC | Guar Gum | 0.25 | 62.19% | 55.88% |
| AFBC | Sodium Silicate | 0.50 | 61.73% | 71.11% |
| AFBC | Bentonite | 0.50 | 79.17% | 83.21% |
| AFBC | Genvis 700 | 0.25 | 71.97% | 88.64% |
| FAC | Sodium Silicate | 0.50 | 81.66% | 64.43% |
| FAC | Guar Gum | 0.25 | 93.74% | 83.29% |
| FAC | Genvis 700 | 0.25 | 93.64% | 91.28% |
| FAC | Bentonite | 0.50 | 93.90% | 94.77% |
| FAF | Guar Gum | 0.25 | 60.10% | 54.62% |
| FAF | Bentonite | 0.50 | 83.99% | 75.10% |
| FAF | Sodium Silicate | 0.50 | 83.23% | 76.53% |
| FAF | Genvis 700 | 0.25 | 71.71% | 76.99% |
| FGD | Guar Gum | 0.25 | 81.08% | 85.36% |
| FGD | Genvis 700 | 0.25 | 86.64% | 88.02% |
| FGD | Bentonite | 0.50 | 95.20% | 93.62% |
| FGD | Sodium Silicate | 0.50 | 95.28% | 96.47% |
| AFBC | Genvis 700 | 0.50 | 70.84% | 53.50% |
| AFBC | Guar Gum | 0.25 | 71.45% | 55.89% |
| AFBC | Bentonite | 1.25 | 79.11% | 58.91% |
| FAC | Genvis 700 | 0.50 | 92.55% | 69.07% |
| FAC | Guar Gum | 0.25 | 93.51% | 75.79% |
| FAC | Bentonite | 1.25 | 97.52% | 75.59% |
| FAF | Guar Gum | 0.50 | 60.07% | 64.50% |
| FAF | Genvis 700 | 0.25 | 85.69% | 72.99% |
| FAF | Bentonite | 1.25 | 92.27% | 72.79% |
| FGD | Guar Gum | 0.50 | 82.65% | 75.09% |
| FGD | Genvis 700 | 0.25 | 90.51% | 92.20% |
| FGD | Bentonite | 1.25 | 97.19% | 89.68% |
| FAF | Bentonite | 1.00 | 91.24% | 77.81% |
| FAF | Bentonite | 1.25 | 92.27% | 72.79% |
| FAF | Bentonite | 0.50 | 84.30% | 75.22% |
| FAC | Bentonite | 1.00 | 95.91% | 85.03% |
| FGD | Bentonite | 1.25 | 97.19% | 89.68% |
| FAC | Bentonite | 1.25 | 97.52% | 75.59% |
| FGD | Bentonite | 0.50 | 93.82% | 87.95% |
| FAC | Bentonite | 0.50 | 96.73% | 85.05% |
| FGD | Bentonite | 1.00 | 97.76% | 94.45% |
| FAF | Bentonite | 1.00 | 84.30% | 74.43% |
| FAF | Bentonite | 0.50 | 82.86% | 70.41% |
| FAF | Bentonite | 0.25 | 89.14% | 80.78% |
| FAF | Bentonite | 0.10 | 87.72% | 80.52% |
| FAF | Bentonite | 0.00 | 90.79% | 79.38% |
| FAC | Bentonite | 1.00 | 98.46% | 93.26% |
| FAC | Bentonite | 0.50 | 98.58% | 92.96% |
| FAC | Bentonite | 0.25 | 98.79% | 90.62% |
| FAC | Bentonite | 0.10 | 98.64% | 89.63% |
| FAC | Bentonite | 0.00 | 96.72% | 90.73% |
| FGD | Bentonite | 1.00 | 89.59% | 85.86% |
| FGD | Bentonite | 0.50 | 92.47% | 89.55% |
| FGD | Bentonite | 0.25 | 93.72% | 87.09% |
| FGD | Bentonite | 0.10 | 87.55% | 81.63% |
| FGD | Bentonite | 0.00 | 90.93% | 88.12% |

The binder-evaluation studies revealed that of the binders evaluated, the use of water alone was the most effective for the FAF and FGD samples, though a small amount of bentonite added to the FGD did show a marginal improvement in the retention of the FGD coating on the AN. Water alone produced a coating that was as durable as that produced with a combination of water and bentonite for the FAC sample. However, a small addition of bentonite did improve the particle-size distribution for that sample (i.e., fewer +6 mesh particles).

EXAMPLE 5

Two drum-roller speeds were evaluated, 70 rpm and 106 rpm (maximum speed). For this evaluation, particle coatings were prepared by mixing AN with bentonite in the amounts shown in Table 4, followed by rolling with a targeted amount of water, adding a predetermined amount of CCB (25 wt. %), and then rolling each mixture for ten minutes. The data presented in Table 4 show that, in general, more durable panicle coatings were formed with the higher drum-roller speed of 106 rpm.

TABLE 4

Influence of roller speed on particle coating.

| CCB | Bentonite % | CCB on AN - initial (%) | CCB on AN attrition (%) | +6 mesh initial (%) | −6 × +20 mesh initial (%) | +6 mesh attrition (%) | −6 × +20 mesh attrition (%) | RPM |
|---|---|---|---|---|---|---|---|---|
| FAF | 0 | 94.5 | 86.3 | 11.9 | 87.1 | 0.2 | 96.8 | 106 |
| FAF | 0 | 90.8 | 79.4 | 6.0 | 95.8 | 0.4 | 94.5 | 70 |
| FAC | 0.5 | 97.7 | 96.1 | 8.8 | 91.0 | 1.3 | 95.0 | 106 |
| FAC | 0.5 | 96.7 | 90.7 | 21.6 | 77.7 | 75.3 | 75.7 | 70 |
| FGD | 0.1 | 93.4 | 90.0 | 0.9 | 98.5 | 0.5 | 98.8 | 106 |
| FGD | 0.1 | 90.9 | 88.1 | 0.6 | 98.7 | 0.3 | 97.6 | 70 |

The impact of roll time during coating of ammonium nitrate prills in the presence of a binder was evaluated by rolling mixtures similar to those described in Table 4 above for 5, 10, or 20 minutes. The most suitable coatings, as reflected by particles in the desired −6 to +20 range and in reduced attrition, were obtained at the shortest roll time evaluated (five minutes; see Table 5).

TABLE 5

Influence of rolling time on particle coating.

| CCB | Bentonite % | CCB on AN initial (%) | CCB on AN - attrition (%) | +6 mesh initial (%) | −6 × +20 mesh initial (%) | +6 mesh attrition (%) | −6 × +20 mesh - attrition (%) | Roll time (min) |
|---|---|---|---|---|---|---|---|---|
| FAF | 0 | 86.3 | 83.9 | 2.1 | 94.9 | 0.4 | 95.7 | 5 |
| FAF | 0 | 90.8 | 79.4 | 6.0 | 95.8 | 0.4 | 94.5 | 10 |
| FAF | 0 | 92.8 | 79.8 | 19.8 | 78.8 | 3.1 | 93.8 | 15 |
| FAC | 0.5 | 97.0 | 87.8 | 20.6 | 79.0 | 9.4 | 87.9 | 5 |
| FAC | 0.5 | 96.7 | 90.7 | 21.6 | 77.7 | 15.3 | 75.7 | 10 |
| FAC | 0.5 | 97.4 | 87.6 | 30.0 | 69.7 | 21.2 | 76.4 | 15 |
| FGD | 0.1 | 92.1 | 90.9 | 0.9 | 98.5 | 0.3 | 99.2 | 5 |
| FGD | 0.1 | 87.5 | 81.6 | 0.6 | 97.7 | 0.1 | 83.0 | 10 |
| FGD | 0.1 | 93.9 | 92.7 | 0.8 | 99.1 | 0.2 | 99.5 | 15 |

Based on the results of the roll-speed and roll duration studies, a roll time of 5 minutes and the maximum roller-mill speed of 106 rpm was used to prepare subsequent CCB-coated ammonium nitrate prill samples used for detonation testing.

EXAMPLE 6

Detonation testing was divided into three phases. In the first, a series of approximately 5-kg (11-12 lb) charges were detonated with an objective of determining the minimum amount of CCB coating needed to stop the propagation of explosion. The second phase focused on evaluation of samples that had been coated with a CCB then crushed prior to detonation with an objective of determining if the effectiveness of the coating could be easily thwarted by crushing. The third phase entailed a larger-scale detonation of approximately 90 kg (200 lbs) of CCB-coated ammonium nitrate to determine if the coatings remained effective in a larger detonation charge.

The preliminary test charges were prepared by coating ammonium nitrate prills with each of the three CCBs (FAF, FAC, FGD) at concentrations of 10, 15, 20, 30, 40, and 50 wt. %. In addition, three samples of uncoated ammonium nitrate and three blanks, one of each CCB without ammonium nitrate, were detonated, for a total of 24 test detonations.

Coatings were applied in one-gallon, 8"-diameter roller drums by rolling for five minutes at 106 rpm. Addition of primary binder (water) was adjusted linearly in accordance with the amount of CCB added. For FAF and FAC, water was added at 0.6% per 10 wt % of CCB. For example, for charges coated with 10% FAC, 0.6% water was added, whereas for charges coated with 40 w % FAC, 2.4% water was added. For FGD, water was added at 0.2% per 10 wt % of COB, and therefore for the analogous FGD coatings, water was added at 0.2% and 0.8%, respectively. No secondary binder was added for the FAF and FGD samples. Western bentonite was added as a secondary binder for the FAC byproduct at a rate of 0.5 wt. %.

The coated samples were sieved to −4×+20 mesh prior to detonation, to more closely approximate the particle size of AN products used in agricultural field application equipment. The total amount of material partitioning to these oversized and undersized fractions was typically 2% or less for the 10-30% CCB-coated samples, but increased substantially at higher CCB concentrations, particularly for the FAC sample for which the combined +4 and −20 mesh fractions ranged up to about 10% of the product weight at a 50% FAC addition rate.

Approximately 5 kg charges were prepared by adding 5.7 wt % diesel fuel, thoroughly blending, and then loading to a steel detonation canister on the day prior to detonation. The charges were allowed to rest to ensure that the fuel oil thoroughly soaked into the ammonium nitrate product. Canisters were constructed by welding a 4-inch diameter×25" steel cylinder to a 16"×16" steel base plate (witness plate), Schedule 40 steel was used as the construction material to provide additional confinement during detonation. Each detonation canister was filled to a height of approximately 24 inches (approximately one inch from the top of the canister). The concentration of fuel oil was maintained within a narrow range in an effort to improve the consistency of the detonation-test results and to obtain maximum energy release during detonation. Immediately prior to detonation, each canister was placed atop a wood platform. A plastic cup containing C4 booster and an electronic detonator were then inserted approximately 2 inches into the top of the charge.

Figure 3:
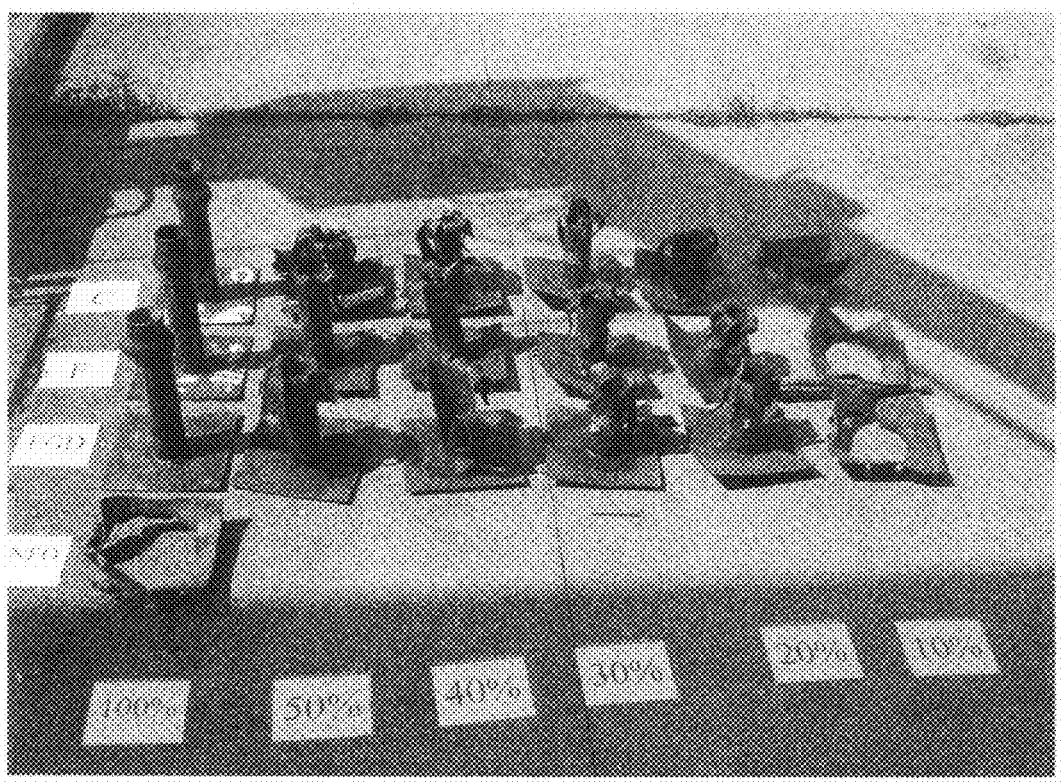
FIG. 3 shows effects of increasing wt. % of various CCB coatings on propagation of explosion of an ammonium nitrate/fuel oil mixture.
Figure 4:
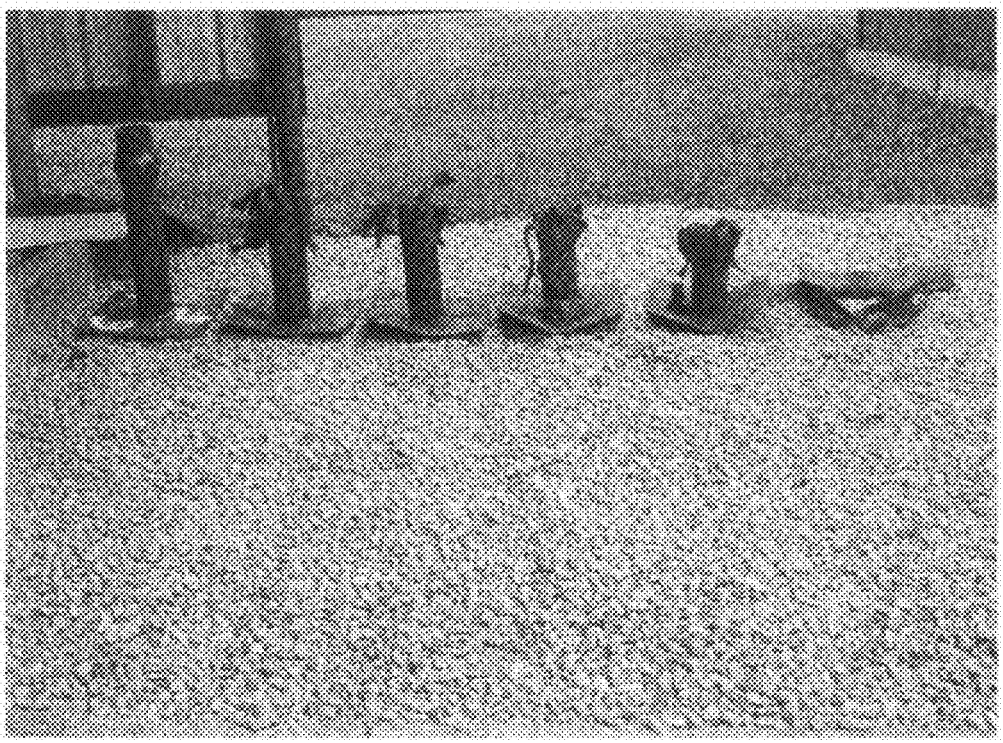
FIG. 4 shows effects of increasing wt. % of FAF coatings on propagation of explosion of an ammonium nitrate/fuel oil mixture.

Canister remnants from the test detonations are shown in FIG. 3. The rows of canisters are grouped according to CCB type with the remnant from detonation of a charge of uncoated (100 wt. %) ANFO shown at bottom left. Decreasing concentrations of CCB are shown from left to right. As can be seen, the energy release as a function of coating concentration was consistent, regardless of which CCB was applied. For all detonations of pure ANFO or ammonium nitrate coated with 10 wt. % CCB, the explosion propagated downward the length of the cylinder and through the witness plate, eliminating the cylinder and blasting a large opening in the witness plate. For samples coated with 15 wt. % or more CCB, the distance the explosion propagated was inversely related to the amount of CCB coated onto the ammonium nitrate. This is shown more clearly in FIG. 4, showing detonation results for ammonium nitrate prills coated with a range of concentrations of FAF. The canister remnants in this photo simulate a bar graph, visually illustrating that the explosion propagated farther down the containment cylinder as the concentration of the FAF coating was decreased.

Figure 5:
FIG. 5 shows unexploded prills remaining after detonation of a 15 wt. % FAC-coated ammonium nitrate/fuel oil mixture.

Further visual evidence that the CCB coatings were effective in stopping the propagation of explosion is shown in FIG. 5. This shows the detonation canister in the position in which it came to rest following detonation of an ammonium nitrate charge coated with 15 wt. % FAC. The damage visible to the upper portion of the cylinder provides evidence that the ammonium nitrate in the top of the charge detonated while the unexploded prills spilled to the ground. This is clear evidence that the propagation of the explosion was halted by the FAC coating. Similar results (not shown) were obtained with 15 wt. % coatings of FAF and FGD byproducts in that the witness plate was not breached during detonation of these latter charges.

Figure 6:
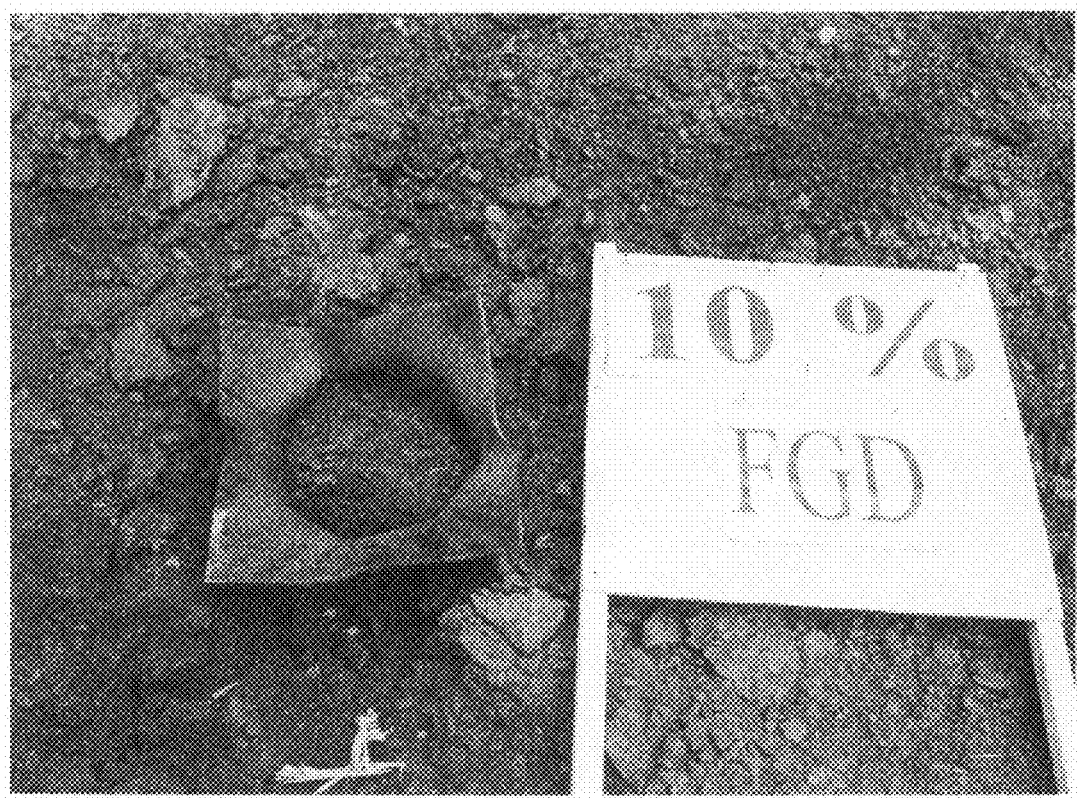
FIG. 6 shows a canister remnant, with no unexploded prills remaining after detonation of a 10 wt. % FGD-coated ammonium nitrate/fuel oil mixture.

In contrast, the propagation of the explosion of the ammonium nitrate, as evidenced by the base plate remnants, was not stopped by a 10 wt. % FGD coating (see FIG. 6). This latter canister remnant clearly shows that the application of a 10 wt. % FGD coating was insufficient to stop the AN explosion from propagating. Similar results were obtained using a 10 wt. % FAF or 10 wt. % FAC coating (data not shown).

EXAMPLE 7

Figure 7:
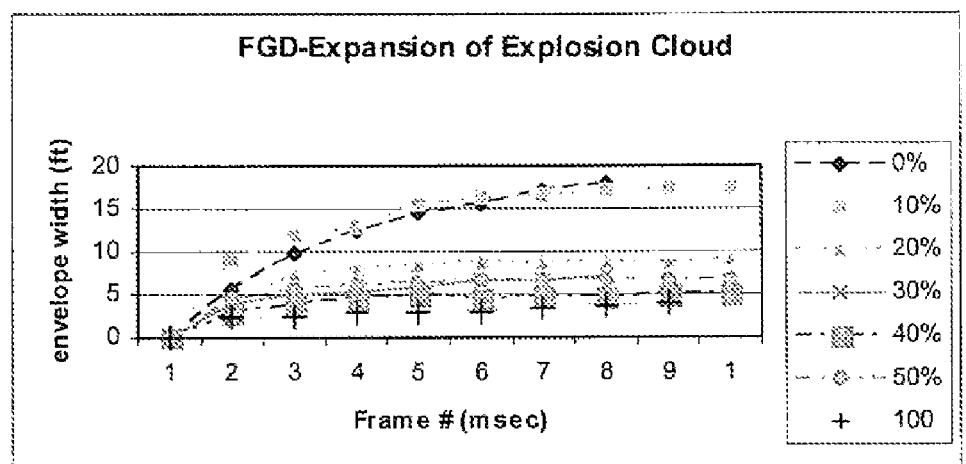
FIG. 7 graphically depicts expansion of explosion clouds after detonation of ammonium nitrate/fuel oil mixtures, with the ammonium nitrate coated with increasing wt. % of various CCB coatings.
Figure 7:
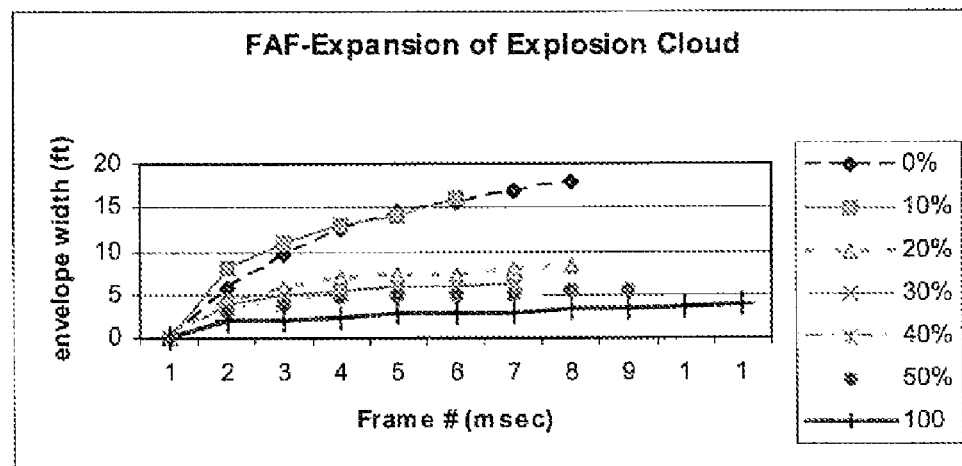
Figure 7:
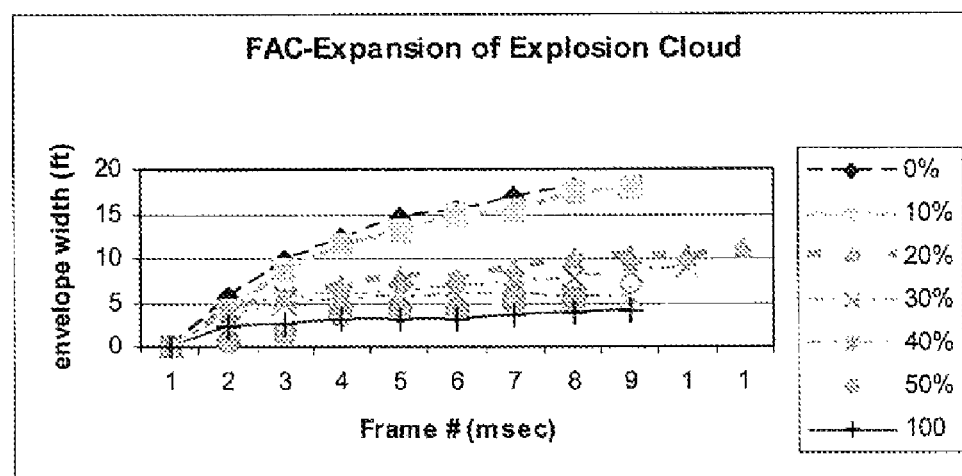

The rate of expansion of an explosion cloud was used to farther compare energy release for the 5-kg charges described above, that is, measurement of the rate at which the dust cloud expanded during detonation. Measurements were made from single-frame photos captured with a high-speed digital-video camera (1000 frames per seconds). The expansion of the explosion clouds for the three CCB byproducts as a function of CCB-coating concentration are plotted in FIG. 7. Each CCB series exhibited a uniform increase in the rate of expansion with decreasing coating concentration from 50 wt. % to 20 wt. % and then exhibited a significant jump in the rate of expansion for the 10 wt. % coatings.

EXAMPLE 8

The effectiveness of the present method was considered in the event of mechanical disruption or crushing of the coated ammonium nitrate prills prior to detonation. The use of CCB coatings to prevent ammonium nitrate from exploding would be of lesser value if the effectiveness of the CCB could be countered by simply crushing the coated particles or by crushing and screening to enrich the ammonium nitrate. To evaluate this possibility, two charges of ammonium nitrate coated with the FGD byproduct at 15 wt. % and 20 wt. %, respectively, were processed at a relatively low crashing pressure through a grinder mill.

Gentle crushing, as opposed to harsh crushing, was selected in an effort to remove the smaller FGD particles from the surface of the ammonium nitrate prills while leaving the prills intact, thereby permitting the ammonium nitrate to be separated from the FAD byproduct coating. However, the inner ammonium nitrate core, which was relatively hard prior to coating, was softened by the coating procedure resulting in most of the ammonium nitrate prills crushing to a small particle size during grinding. Subsequent efforts to enrich the ammonium nitrate by screening the crushed samples were unsuccessful for a number of reasons including the fact that the CCB and ammonium nitrate components were often of similar particle size following crushing, the CCBs remained intimately associated with the ammonium nitrate powder and attempts to screen the crushed samples resulted in blinding of the screens preventing the crushed samples from passing.

Figure 8:
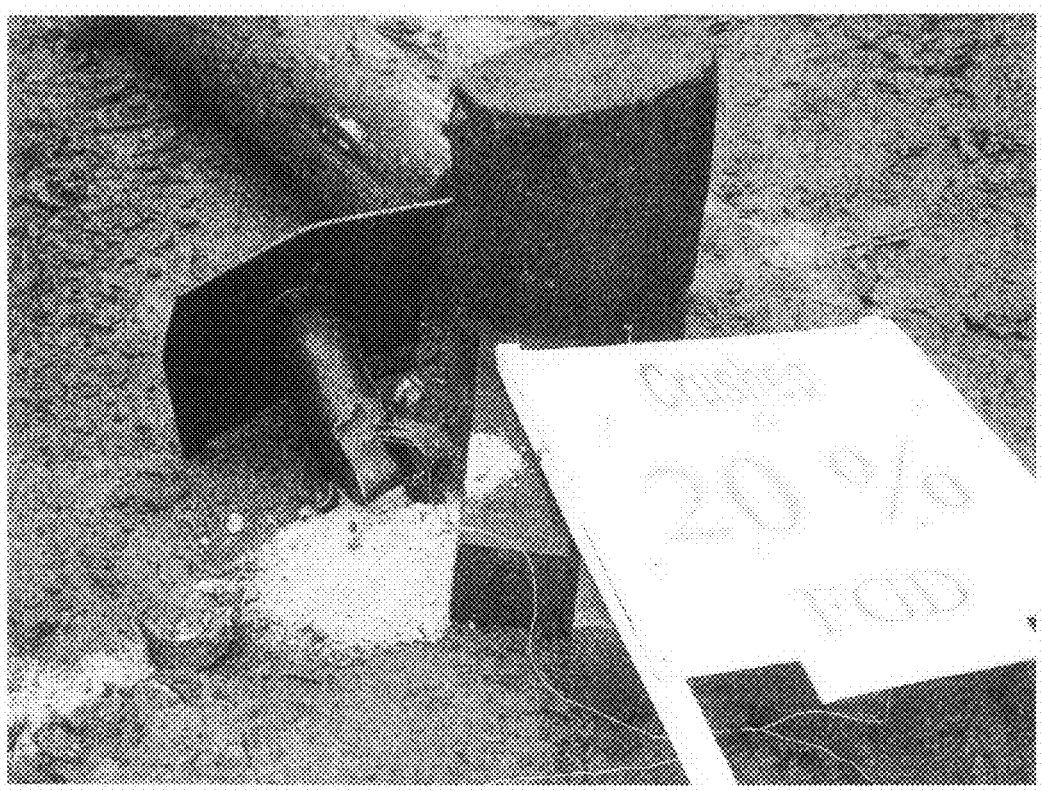
FIG. 8 shows unexploded prills remaining after detonation of a 20 wt. % FGD-coated ammonium nitrate/fuel oil mixture, with crushing of the coated ammonium nitrate prior to detonation.
Figure 9:
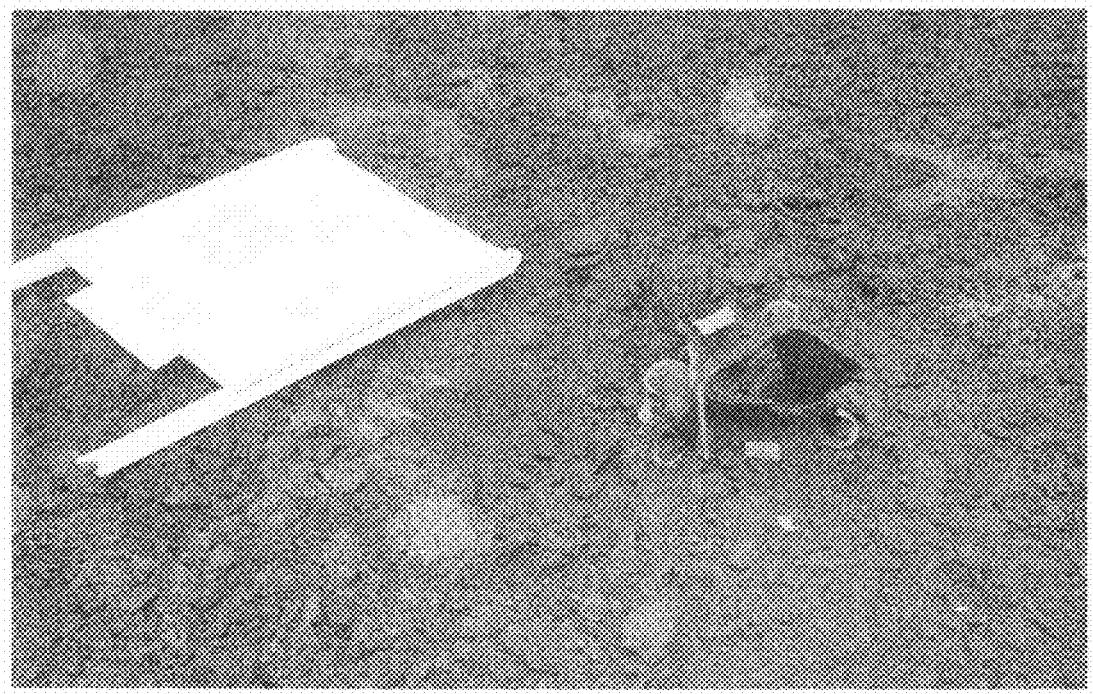
FIG. 9 shows the base plate remnant remaining after detonation of a 15 wt. % FGD-coated ammonium nitrate/fuel oil mixture, with crushing of the coated ammonium nitrate prior to detonation and showing the absence of any unexploded prills.

Approximately 5-kg of each of the crushed samples was loaded to a steel canister and detonated as described above. With reference to FIG. 8, showing the canister remnant following detonation of a crushed sample coated with 20 wt. % FGD, again spillage of unexploded material onto the ground following detonation was noted. In contrast, the canister remnant for the crushed 15 wt. % FGD-coated sample (FIG. 9) showed fall propagation of the explosion, totally eliminating the upper portion of the containment cylinder and severely damaging the base plate.

Based on the above results from detonation tests of 5-kg charges of CCB-coated ammonium nitrate, it was clear that CCB coatings of 15 wt. % or greater were effective in stopping the propagation of an ammonium nitrate explosion. The 15% level of coating was less effective in reducing propagation of explosion when the coated prills were crushed prior to detonation, but a 20 weight percent coating was found to be sufficient to halt the explosion even after the particles had been crushed prior to detonation.

EXAMPLE 9

Next, consideration was given to ascertaining whether the present method was effective in stopping or mitigating explosion of coated ammonium nitrate prills in a larger test charge. Based on its performance in the 5-kg detonations tests as set forth above, as well as the relative ease of coating a 20 wt. % FGD-coated charge was selected for this evaluation. The large scale sample was prepared in essentially the same manner as were the 5-kg charges, with the exception of application of the coatings in a larger vessel, that is a five-gallon, 11-inch-diameter drum. Qualitatively, the larger drum roller was found to perform better than the one-gallon drum in terms of the uniformity of ammonium nitrate prill coverage, improved particle size distribution (fewer +6 and −20 mesh particles), and better coating strengths. This demonstrates promise for commercial scale up of the process.

Approximately 125 kg (~275 lbs) of ammonium nitrate sample coated with 20 wt. % FGD was produced and screened to −4×+20 mesh. The amount of oversized +4 mesh particles removed was 0.8% while the amount of undersized −20 mesh particles removed was 2.9%. Since the FGD/ammonium nitrate ratio is higher in both the oversized (+4 mesh) and under-sized (−20 mesh) particles, the actual FGD coating applied to the AN was approximately 17 wt % as confirmed by a subsequent laboratory analysis.

On the day before detonation, approximately 90 kg (200 lb) of the coated sample was mixed with fuel oil and loaded to an 18.5-inch diameter plastic drum to a height of approximately 24 inches. A 90-kg charge of 100% ammonium nitrate served as a control. After soaking overnight, the loaded drums were placed atop a 3'×3' schedule-40-steel witness plate atop a wooden platform. An electronic initiator was inserted into C4 booster which in turn was inserted into the top of each charge. Detonations were recorded with hi-resolution DVD and high-speed video cameras.

Figure 10:
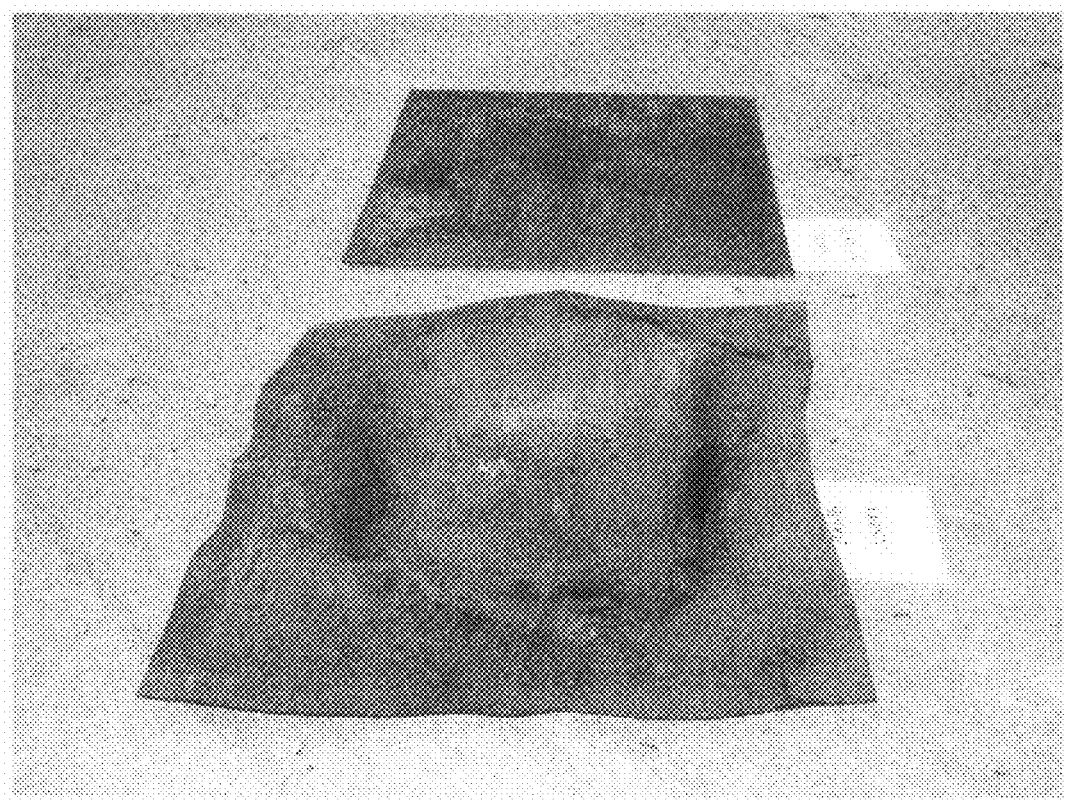
FIG. 10 shows witness plates remaining after detonation of 91 kg (200 lb) charges of uncoated and coated (20 wt % FGD) ammonium nitrate.

Post detonation inspection of the test site showed evidence of the effectiveness of the FGD coating in suppressing the ammonium nitrate explosion, as demonstrated by large quantities of unexploded prills on the ground and relatively minor disturbance to the surrounding area for the coated sample versus cratering and an absence of containment-drum remnants following detonation of the uncoated ammonium nitrate. The relative impact on the witness plates can be seen in FIG. 10, showing a witness plate with substantial explosion damage for the uncoated charge (front) and a flat, undeformed plate for the coated charge (back).

EXAMPLE 10

Coal combustion by-products as described herein are inexpensive, available in large quantities, and further are classed as non-hazardous by the Environmental Protection Agency. In 2005, over 123 million tons of CCBs were produced in the US compared to domestic production of approximately two million tons of ammonium nitrate Fertilizer. Thus, the amount of CCBs produced annually would suffice to treat the amount of ammonium nitrate fertilizer produced annually many times over. Currently, the majority of CCBs produced are discarded by the producer at significant expense. However, in addition to advantages of cost and supply, CCBs may include components of agricultural value, such as lime or other pH adjusting components. Indeed, CCBs themselves may have value as soil ameliorants, and are known to contain valuable plant nutrients (calcium, potassium, trace elements and the like).

To evaluate this potential, divided samples of the large-scale coated ammonium nitrate prills as described above were subjected to screening evaluations to obtain an indication of the potential impact that FGD-coated ammonium nitrate pills might have on agricultural use. Two evaluations, bulk density and particle size distribution, provided an indication of how the coated ammonium nitrate prills might perform in the field-application equipment. A third test, measurement of nitrogen-release rate, provided an indication of how quickly the nitrogen was released to the soil following application.

As expected, the coated-sample particle size range shifted toward larger particles. Nonetheless, the bulk of the coated particles fell within the lower and upper limits of the size range targeted for field application (−6×+20 mesh, see above). Obtaining a closer fit to the conventional size distribution would require coating of smaller-sized AN prills. However, considering that a higher tons/acre setting would be needed to obtain the equivalent nitrogen application when applying coated particles, it is possible that a significant manufacturing adjustment of the pre-coated AN particle size would not be necessary but rather a simple increase in the hopper opening night suffice. Regardless, either approach is achievable without a significant increase in production costs or disruption to normal farm operations.

Attrition testing of the coated particles resulted in only minor changes in the particle size distributions. Due to the small particles of FGD used to coat the ammonium nitrate, it was anticipated that any FGD coating dislodged during tumbling would subsequently be recovered in the pan (−20 mesh) during screening. However, the weight of the −20 mesh material exhibited a relatively minor increase from 0.3% to 0.7% following attrition. This indicated that the particle coatings are relatively durable and capable of withstanding the rigors of handling and field application.

Bulk density can impact flow properties and application rates. Measurement of the bulk density indicated a relatively minor difference in bulk density between the coated (58.7 lbs/ft$^3$) and uncoated (61 lbs/ft$^3$) particles, again indicating that the coated particles would behave in an acceptable manner in the packaging and application equipment in common use.

The final agricultural evaluation was comparison of the relative nitrogen-release rate for coated versus uncoated ammonium nitrate prills. Desirably, a coated prill would release nitrogen at a similar rate to an uncoated ammonium nitrate prill, to provide an agriculturally suitable soil amendment product. The time required for the nutrient nitrogen to be released into the soil following application could be detrimental if substantially prolonged. Divided samples of the 20% FGD coated sample was subjected to an irrigated soil burial test in which the particles were exposed to moistened soil followed by a timed measurements of the amount of undissolved ammonium nitrate remaining.

As shown in Table 6, the release of nitrogen progressed at similar rates for both the coated and uncoated samples. These results suggest that the release of nitrogen from the coated particles would not be significantly delayed. Accordingly, ammonium nitrate treated according to the presently described method would provide an end product suitable for its intended use as fertilizer, but also exhibiting significantly reduced explosive potential.

TABLE 6

Irrigated soil test demonstrating percent undissolved nitrogen remaining over time.

| | Initial N % | % N at 9 hr | % N at 24 hr | % N at 72 hr |
|---|---|---|---|---|
| Uncoated ammonium nitrate | 33.32 | 1.01 | 0.99 | 0.79 |
| Coated ammonium nitrate (20% w/w FGD) | 27.77 | 1.16 | 1.06 | 0.59 |

In accordance with the foregoing descriptions, it is shown that ammonium nitrate coated according to the present method provides an end product with significantly reduced explosive potential. Advantageously, the method utilizes materials for coating which are inexpensive and readily available materials, that is, by-products of the coal combustion process. Even more, such byproducts themselves may provide valuable soil nutrients and pH adjustment agents, in addition to the known fertilizer properties of ammonium nitrate. The coated ammonium nitrate end product is resistant to separation of uncoated ammonium nitrate by mechanical disruption. Even more, the method described herein provides an end product which releases nitrogen at a rate similar to a corresponding uncoated product and which is suitably sized for delivery as a soil amendment using conventional equipment. Therefore, it can be appreciated that the present method provides an ammonium nitrate of significantly reduced explosive potential, but which retains its primary function as an agricultural fertilizer.

Even more, ammonium-based fertilizers such as ammonium nitrate are known to be highly hygroscopic, and readily absorb moisture from the air during storage and application. This can lead to severe caking of the product, which may render it unsuitable for use as it can no longer be fed through field application equipment. Yet another advantage of the presently described methods and compositions described herein is found in that the coating step suppressed moisture absorption by the ammonium nitrate product, improving flowability and extending shelf life, and providing a product which not only possessed significantly reduced explosive potential, but was also more suitable for use in commercial equipment for field application.

The foregoing description of a preferred embodiment of the invention has been presented for purposes: of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for reducing the explosive potential of an ammonium nitrate, comprising coating said ammonium nitrate with a coal combustion by-product composition comprising from 12 wt. % to 50 wt. % of said ammonium nitrate.

2. The method of claim 1, wherein the coal combustion by-product is selected from the group consisting of Class C fly ash, Class F fly ash, flue gas desulfurization waste, atmospheric fluidized bed combustion waste, and a mixture thereof.

3. The method of claim 2, wherein the flue gas desulfurization waste is oxidized prior to coating the ammonium nitrate.

4. The method of claim 1, wherein the ammonium nitrate is coated with about 15 wt. % of said coal combustion by-product.

5. The method of claim 1, wherein the ammonium nitrate is coated with about 20 wt. % of said coal combustion by-product.

6. A method for reducing the explosive potential of an ammonium nitrate, comprising coating said ammonium nitrate with a composition comprising:
   a coal combustion by-product in an amount of from 12 wt. % to 50 wt. % of said ammonium nitrate; and
   a primary binder.

7. The method of claim 6, wherein the ammonium nitrate is coated with about 15 wt. % of said coal combustion by-product.

8. The method of claim 6, wherein the ammonium nitrate is coated with about 20 wt. % of said coal combustion by-product.

9. The method of claim 6, wherein the primary binder is water.

10. The method of claim 9, wherein the primary binder is added in an amount of from about 0.2% to about 0.6% per 10 wt. % of the coal combustion by-product.

11. The method of claim 10, wherein the primary binder is added in an amount of from about 0.5 wt% to about 2.0 wt. % of the coated-product weight.

12. The method of claim 6, further including adding a secondary binder.

13. The method of claim 12, wherein the secondary binder is at least one organic binder selected from the group consisting of guar gum and starch, or at least one inorganic binder selected from the group consisting of sodium silicate and bentonite.

14. The method of claim 13, wherein the secondary binder is an organic binder and is added in an amount of from about 0.25 wt. % to about 0.5 wt. % of the coated-product weight.

15. The method of claim 13, wherein the secondary binder is an inorganic binder and is added in an amount of from about 0.1 wt. % to about 1.25 wt. % of the coated-product weight.

16. The method of claim 15, wherein the secondary binder is an inorganic binder and is added in an amount of about 0.5 wt. % of the coated-product weight.

17. A method for reducing explosive potential of ammonium nitrate, comprising the steps of:
   a) providing an ammonium nitrate;
   b) providing a binder composition;
   c) providing a coal combustion by-product in an amount of from 12 wt % to 50 wt % of the ammonium nitrate;
   d) combining the ammonium nitrate, binder composition, and coal combustion by-product of steps a) through c); and
   e) obtaining a coated ammonium nitrate having a particle size distribution range of from about −6 to about +20 mesh.

18. The method of claim 17, wherein the coal combustion by-product is selected from the group consisting of Class C fly ash, Class F fly ash, flue gas desulfurization waste, atmospheric fluidized bed combustion waste, and a mixture thereof.

19. The method of claim 17, wherein the ammonium nitrate is coated with about 15 wt. % of said coal combustion by-product.

20. The method of claim 17, wherein the ammonium nitrate is coated with about 20 wt. % of said coal combustion by-product.

21. The method of claim 17, wherein the binder composition comprises water added in an amount of from about 0.2% to about 0.6% per 10 wt. % of the coal combustion by-product and at least one secondary binder selected from the group consisting of an organic binder and an inorganic binder.

22. The method of claim 21, wherein the organic binder is guar gum or starch and is added in an amount of from about 0.25 to about 0.5 wt% of the coated-product weight.

23. The method of claim 21, wherein the inorganic binder is sodium silicate or bentonite and is added in an amount of from about 0.25 to about 1.25 wt % of the coated-product weight.

* * * * *